March 6, 1962
J. K. UDELMAN
3,023,742
PISTONLESS ROTARY INTERNAL COMBUSTION
ENGINE, COOLED BY PRESSURED AIR
Filed June 15, 1960
3 Sheets-Sheet 1
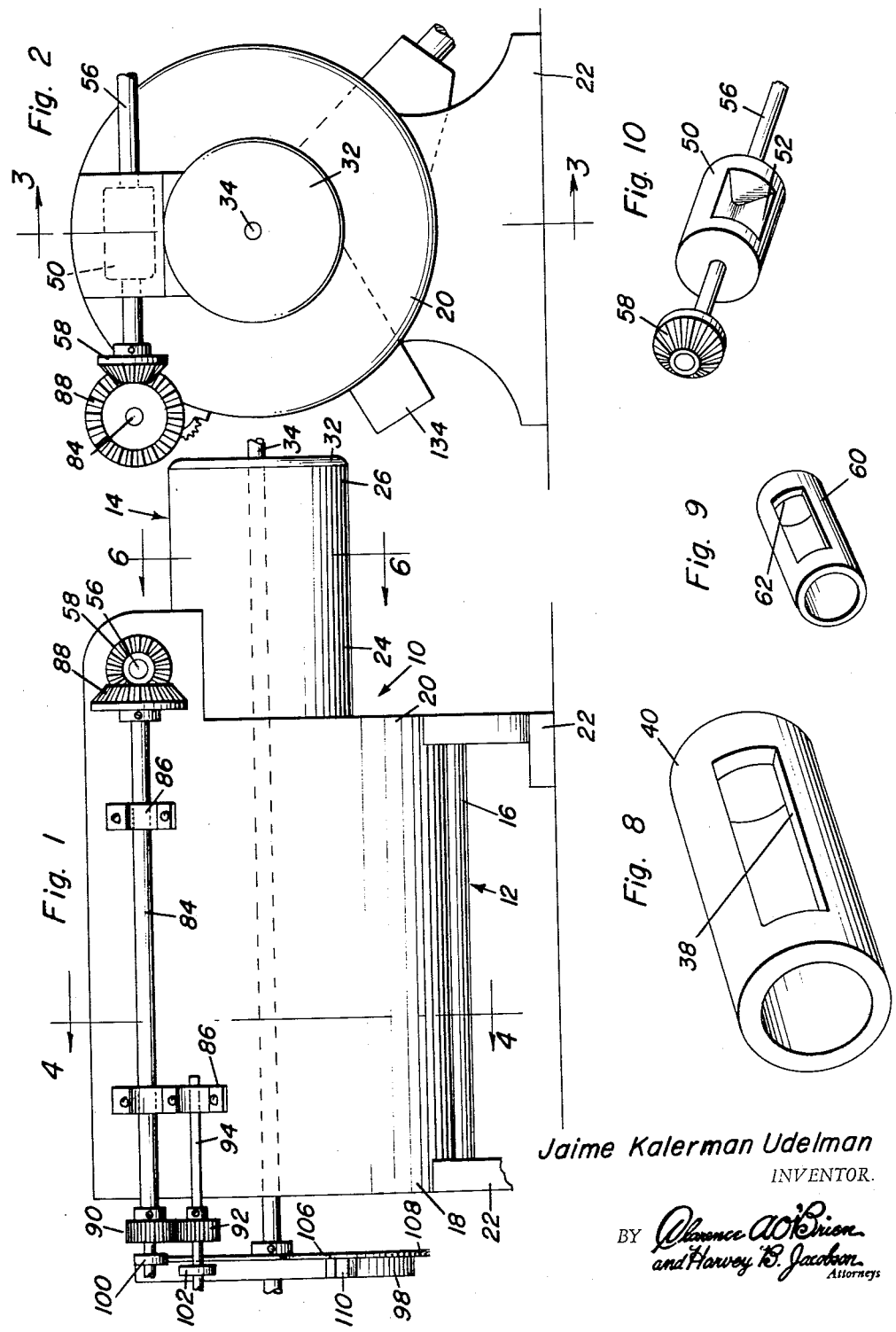
Jaime Kalerman Udelman
INVENTOR.

March 6, 1962 J. K. UDELMAN 3,023,742
PISTONLESS ROTARY INTERNAL COMBUSTION
ENGINE, COOLED BY PRESSURED AIR
Filed June 15, 1960 3 Sheets-Sheet 2
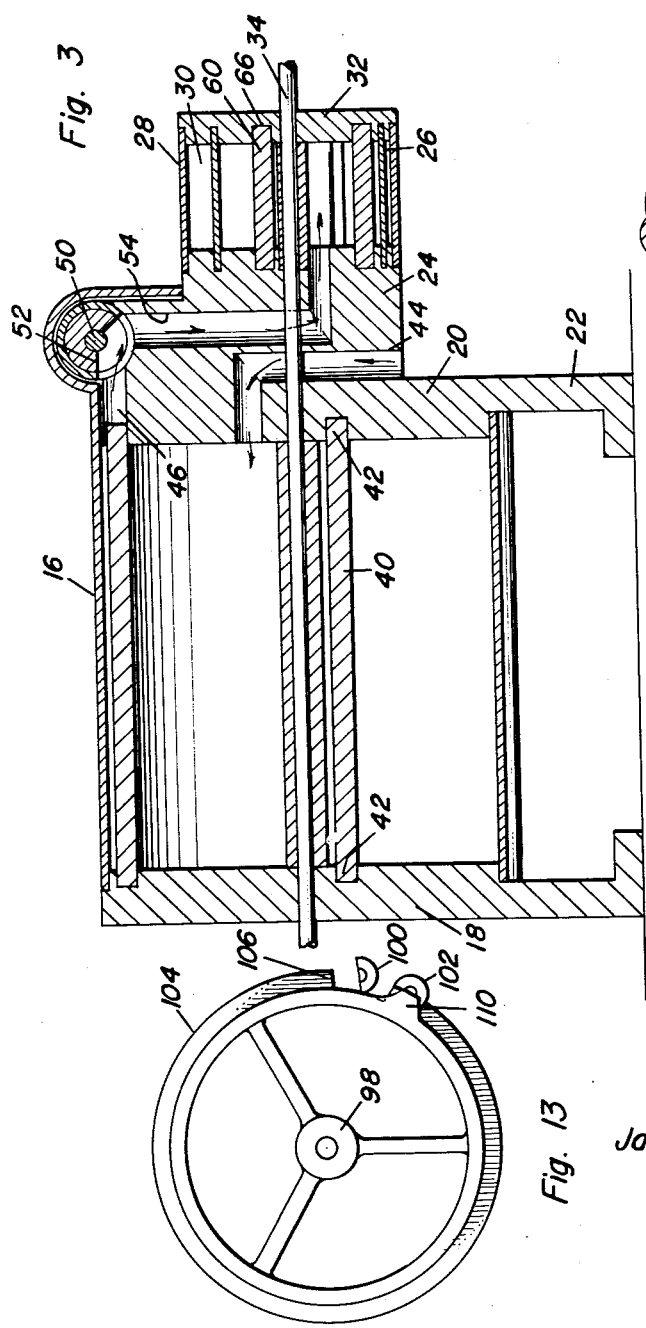
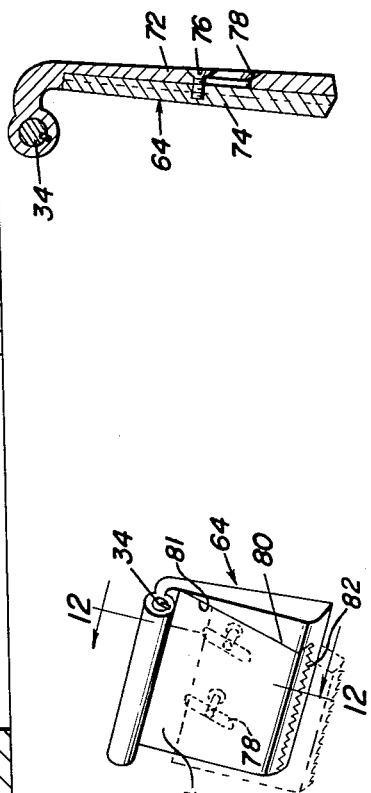
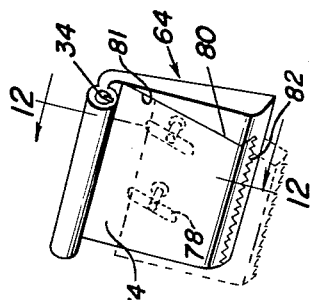
Jaime Kalerman Udelman
INVENTOR.

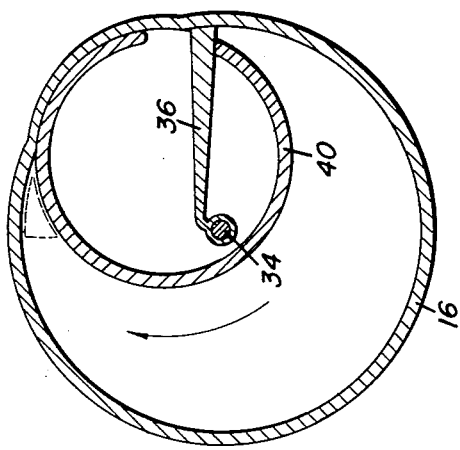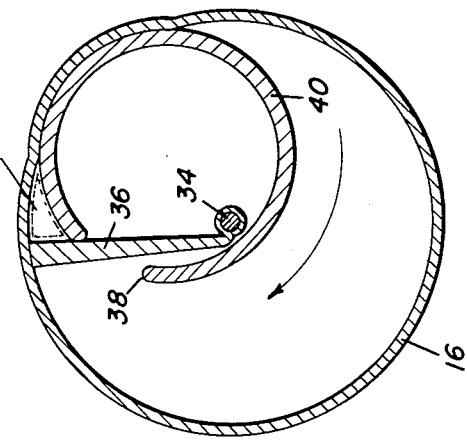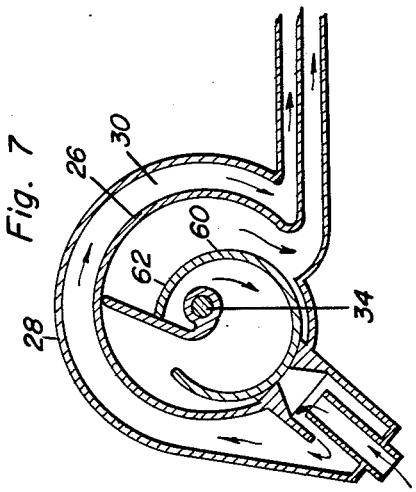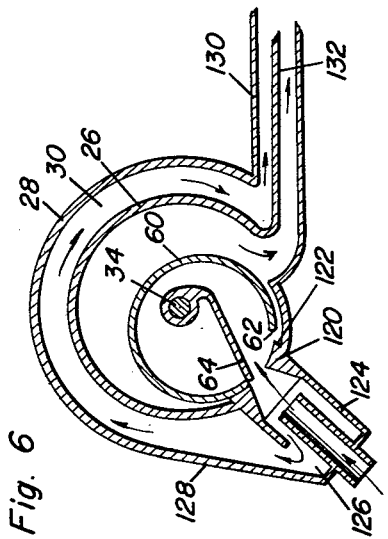

United States Patent Office 3,023,742
Patented Mar. 6, 1962

3,023,742
PISTONLESS ROTARY INTERNAL COMBUSTION ENGINE, COOLED BY PRESSURED AIR
Jaime Kalerman Udelman, Avenida M. Felipe Tovar, Edificio "Hena," Apt. 3, San Bernardino, Caracas, Venezuela
Filed June 15, 1960, Ser. No. 36,218
6 Claims. (Cl. 123—8)

The present invention generally relates to internal combustion engines of the rotary type and more particularly to a pistonless rotary internal combustion engine cooled by pressured air and having a compressor assembly for compressing a combustible mixture and discharging it into the combustion vane sleeve of the rotary engine and this invention represents important and novel improvements on prior Patent No. 2,682,258.

The primary object of the present invention is to provide a rotary internal combustion engine including a novel structural arrangement for effecting the cooling of the interior and exterior surface of the combustion cylinder for maintaining the rotary engine at a desired temperature for most effective operation.

Another object of the present invention is to provide a rotary internal combustion engine together with a compressor for supercharging the combustible mixture in which the compressor sleeve is substantially twice as long and twice the diameter of the combustion sleeve.

Another feature of the present invention is to provide a rotary internal combustion engine incorporating in its construction a novel control mechanism for discharging the compressed combustible mixture into the interior of the combustion sleeve at a proper timed interval in relation to the compression of the combustible mixture.

Yet another important object of the present invention is to provide a rotary internal combustion engine employing conventional components such as a carburetors, ignition devices and control devices for governing the speed of operation of the engine.

Still another feature of the present invention is to provide a rotary combustion engine of the type employing a vane having an outer end engageable or substantially engageable with the inner surface of the combustion sleeve with the size of the vane being adjustable for orientating the vane properly in relation to the internal surface of the combustion sleeve.

Another object of the present invention is to provide an internal type rotary combustion engine that is simple in construction, easy to operate, efficient in operation and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the rotary internal combustion engine of the present invention illustrating the proportions of the compressor and the rotary engine;

FIGURE 2 is an end view of the construction of FIGURE 1;

FIGURE 3 is a longitudinal, vertical sectional view taken substantially upon a plane passing along section line 3—3 of FIGURE 2 illustrating the details of construction of the interior of the compressor and rotary engine;

FIGURE 4 is a transverse, sectional view taken substantially upon a plane passing along section line 4—4 of FIGURE 1 illustrating the details of construction of the compressor in one position of the structural components;

FIGURE 5 is a sectional view similar to FIGURE 4 but illustrating the components of the compressor in another position;

FIGURE 6 is a transverse, vertical sectional view taken substantially upon a plane passing along section line 6—6 of FIGURE 1 illustrating the details of construction of the internal combustion engine with the components of the engine being illustrated in one position;

FIGURE 7 is a sectional view similar to FIGURE 6 but illustrating the components in another position;

FIGURE 8 is a perspective view of the rotary cylindrical sleeve employed in the compressor;

FIGURE 9 is a perspective view of the rotary cylindrical sleeve employed in the internal combustion engine;

FIGURE 10 is a perspective view of the rotary valve for communicating in timed relation the compressor discharge with the combustion engine intake;

FIGURE 11 is a perspective view of the vane or blade employed in the device;

FIGURE 12 is a detailed sectional view taken substantially upon a plane passing along section line 12—12 of FIGURE 11 illustrating the structural features thereof; and FIGURE 13 is an end view of the control apparatus for controlling operation of the rotary valve.

Referring now specifically to the drawings, the numeral 10 generally designates the complete rotary engine of the present invention which includes a compressor generally designated by the numeral 12 and an internal combustion rotary engine generally designated by the numeral 14. Note that the compressor 12 is substantially twice the diameter of the engine 14 and is also at least twice the length thereof.

The compressor 12 includes a substantially cylindrical casing 16 provided with end walls 18 and 20. Each of the end walls 18 and 20 has extensions 22 depending therefrom for engaging a supporting surface thereby providing support for the assembly. Attached to or formed integrally with the end wall 20 is a relatively thick circular plate 24 which is either attached to the end wall 20 or formed integral therewith and connects the rotary engine 14 to the compressor. The rotary engine 14 includes a working cylinder 26 and an outer cylindrical housing 28 spaced therefrom for forming a cooling jacket or passageway 30 for continuous passage of cooling air. Suitable bolts are provided for holding the end plates in position and also for retaining the working cylinder 26 and the cylindrical housing 28 joined to the plate 24 by virtue of there also being provided an end plate or wall 32 for the internal combustion engine 14. The entire assembly is provided with a centrally disposed rotating shaft 34 which extends therethrough and which may be provided with any suitable mechanism for utilizing the energy and power produced by the engine.

The portion of the shaft 34 disposed within the cylinder 16 of the compressor is provided with a compressing vane 36 extending outwardly from the shaft 34 in substantially a tangential relationship as illustrated in FIGURES 4 and 5. The vane 36 extends outwardly through a thin slot or opening 38 in an eccentrically rotatable cylindrical sleeve 40 which is journaled in annular recesses 42 in the end walls 18 and 20 respectively. The leading and trailing edges of the slot or opening 38 are convexly rounded for bearing engagement with the surfaces of the vane 36 inasmuch as the vane 36 acts to cause rotation of the sleeve 40.

The cylindrical block or plate 24 on the end wall 20 is provided with an L-shaped intake passageway 44 for providing an intake for the compressor. Any suitable combustible mixture supplying apparatus may be attached to the intake passageway 44. For example, a carburetor or other similar air and fuel mixture device may be connected with the intake passageway for admitting a combustible mixture for discharge into the interior of valve sleeve 40.

The end wall 20 and the cylindrical plate 24 are provided with an outlet passageway 46 leading from the compressor to a valve area 48 having a rotary cylindrical valve 50 therein. The valve 50 has hollow area 52 therein and having an angular extent greater than 90°, the width and depth being equivalent to one half of the diameter for communicating the outlet passageway 46 with an L-shaped passageway 54 in plate 24 which extends to and communicates with the interior of the cylinder 26 and specifically the interior of combustion sleeve 60. The valve 50 is provided with a shaft 56 journaling the valve 50 with the shaft 56 having a beveled spur drive gear 58 on one end thereof for driving engagement with a drive mechanism described hereinafter.

The internal combustion engine is also provided with an eccentric rotatable valve sleeve 60 constructed from a material having the property of not heating rapidly. Also, the inner surface of the valve sleeve is coated with a material that is heated with difficulty. The sleeve 60 has an opening or slot 62 therein having convexly rounded edges which receive and engage a vane 64 carried by the shaft 34 with the vane 64 extending from the shaft 34 in substantially tangential relation. The cylindrical sleeve 60 is journaled in eccentric recesses 66 in the end plate 32 and the outer end of the cylindrical plate 24 respectively for rotation about an axis eccentric to the shaft 34 whereby ignition of the combustible mixture against the vane 64 will cause rotation of the vane 64, the sleeve 60 and the shaft 34 in an obvious manner.

The combustion cylindrical sleeve 60 is provided with any suitable ignition means for igniting the combustible mixture at the proper timed interval. Such ignition device may be in form of a spark plug or an equivalent device and a magneto or any other equivalent structure for producing an ignition spark across the electrodes of a spark plug.

The vane 64, as shown in FIGURES 11 and 12, is adjustable in size in that it employs a main plate 72 and a movable plate 74 secured together by countersunk screw threaded fasteners 76 extending through the main plate 72 and being received in counterbored diagonal slots 78 in the plate 72 thereby providing smooth external surface to the plate 72. The movable plate 74 is provided with an inclined edge surface 80 and slidably engages an inclined abutment 81 on the plate 72. A plurality of serrations 82 interengage the plates 72 and 74 for securing these components in position and the slots 78 and serrations 82 parallel the surfaces 80 and 81. Further, the movable plate 74 may be disposed on either side of the stationary or main plate 72.

For rotating the valve 50, there is provided a lay shaft 84 journaled on the compressor 12 by bearings 86. The lay shaft 84 is provided with a bevel gear 88 at one end thereof in meshing driving engagement with the bevel gear 58. The other end of the shaft 84 is provided with a spur gear 90 in meshing engagement with a gear 92 carried by a shaft 94 also journaled by one of the bearings 86. The outer end of the shaft 84 is provided with an operating cam follower 100 and the outer end of the shaft 94 is provided with a cam follower 102 which is spaced langitudinally or axially from the cam member 100.

Mounted on the shaft 34, there is provided a cam actuator in the form of a drum or spoked wheel 98 having a peripheral radial flange 104 at the inner edge thereof. Flange 104 includes a notch 106 cut out therefrom for engaging and rotating the cam follower 100. The spoked wheel 98 includes an axial flange spaced radially inwardly from the periphery of the radial flange 104 and provided with a radially outwardly extending cam member 110 for rotating the cam follower 102 a partial revolution each time it is engaged by its operating cam. With this structure, the motion imparted to the shafts 84 and 94 will be imparted to the shaft 84 by virtue of gears 90 and 92 thereby rotating the valve 50 in the desired manner for admitting compressed combustible mixture into the interior of sleeve 60 of the rotary engine at the desired intervals.

The rotatable sleeves in both the compression cylinder 16 and in the combustion cylinder 26 may actually be termed rotatable sleeve valves for the respective vanes which extend therethrough. Note that the cylindrical sleeves or valves are actually received in a laterally bulged portion of their respective cylinders and this bulged portion extends for approximately 90° or less to provide a bearing surface and fluid seal between the outer surface of the cylindrical sleeves or valves 40 and 60 and the inner surface of the respective cylinders. The leading side of the vane is in fluid sealing contact with the adjacent edge of a slot in one of the cylindrical sleeves. Under these conditions, air will be compressed between or from the left hand end of the crescent shaped space between the cylindrical sleeve or valve and the main cylinder to the right hand end of this space and will be compressed at the right hand end of this space. The intake is admitted through the passageway and the cylindrical block or plate and is provided with a suitable carburetor or other fuel and air mixing device attached thereto and the air is discharged when in compressed state to the combustion chamber through the valve and corresponding passageway.

Ignition takes place a short interval after the vane has moved past the bulged portion in the combustion cylinder and is in contact with the inner surface of the cylinder at the right hand side of the bulged portion. When the fuel charge is ignited, the expansion of the combustion gases between the main and the cylindrical valve sleeve forces the vane to rotate around the inner surface of the cylinder about the axis of the shaft carrying the valve with it. The valve makes a fluid tight seal with the vane at the side of the vane remote from the bulged out portion while the vane is slightly separated from the valve at the opposite edge of the valve slot.

In order to obtain a workable compression ratio for an internal combustion engine, for example a ratio of 10 to 1, it is necessary that the space in the compression cylinder not occupied by the vane at the end of the compression cycle have a volumetric capacity of approximately $\frac{1}{11}$ the volumetric capacity of the space.

In actual practice, the vanes are at substantially right angular relation to each other during their rotational movement and it is pointed out that the vanes do operate from the same shaft and, of course, are rigid with the same shaft 34. Also, the outwardly bulged portion or portion of modified radius of the two cylinders is angularly displaced approximately 90° from each other.

There may be provided a spark plug opening in the end wall in registry with the interior of the combustion sleeve valve and a spark plug or the like of conventional construction may be mounted in this opening. Suitable mechanism controlling the supply of ignition current to the spark plug is provided at the outer side of the end wall and may include any suitable construction. For a more comprehensive understanding of the details of the ignition system as well as the fuel supply system, reference may be had to Patent No. 2,682,258 and since this is conventional, no additional details of the ignition and fuel supply mechanism is included.

It is pointed out that the combustion cylinder of the present invention is air cooled somewhat in the nature of the type of cooling employed in present day automobiles especially that type employed with the "Volkswagen." In this engine, the combustible mixture is ignited for approximately twice as long as in a regular reciprocating piston motor. In describing the air cooling, it is pointed out that the seat 120 (see FIGURES 6 and 7) forms a seat on which the sleeve valve 60 rotates thus lessening friction. In actual practice, the curve of the seat is provided with a greater radius than the sleeve valve 60 and includes a projection 122 which closely engages and conforms with the surface of the sleeve valve 60. The seat 120 is provided with a radially extending member generally in the form of a cylindrical member 124 having an opening 126 adjacent the bottom thereof and this opening is communicated by the inclined wall 128 with the space 30 between the cylinder 26 and the wall 28. The opening 126 forms a guide or chute for fresh air for cooling. This air shall be supplied by means of a continuous pressure derived from a fan installed in the outer part of the cylinder. The fan may be coupled with the motor working with energy from the latter or it may be fed by power from an independent plant. This stand will pump fresh air constantly and continuously so as to continuously cool the outside of cylinder 26 and, of course, cool all surfaces it comes into contact with.

Internal cooling of cylinder 26 is provided, after expulsion of the previously burnt gases from the cylinder 26, when the engine is at a dead center point with the sleeve valve 60 together with the vane 64 and the slot 62 being disposed perpendicular to the seat surface 122. In this condition, the air of the fan acquires free access through the perforation or opening 126 and the member 124 into the interior of the combustion cylinder 26. The cooling air passes out through a passageway 132 which also scavenges the exhaust products by entraining them as they are discharged. During this passage of the cooling air, the inner walls of the cylinders and the surfaces of the vane and the sleeve valve are all cooled and the air and exhaust products leave through the exhaust pipe 132. This is the arrangement when the vane 64 is perpendicular to the seat 122 as shown in FIGURE 6. As the vane 64 passes beyond the seat 122, air then passes through the opening 126 and through the space 30. Thus, in one position sleeve valve 60, air passes through the interior of the sleeve valve 60 and between the sleeve valve 60 and the cylinder 26 and in any other position of valve 64, air continuously passes over the exterior surface of the cylinder 26 thus cooling both the inner and outer surface of the cylinder 26. The external cooling is carried out continuously and internal cooling is carried out at regular intervals, constantly and automatically in the course of every complete revolution of the central shaft 34.

This cooling system accomplishes a maximum degree of efficiency and contains the least possible number of component parts. This cools the entire outer and inner portions of all combustion motor components and it is pointed out that the particular construction of the fan may be varied as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rotary internal combustion engine comprising a compression cylinder and a combustion cylinder arranged in axial alignment with the compression cylinder having at least twice the volume of the combustion cylinder, each of said cylinders having outer end walls, a relatively thick plate separating the cylinders, a common shaft extending throughout the length of said cylinders, a compression vane mounted on said shaft within the compression cylinder and having an outer end disposed adjacent the inner surface of the compression cylinder, a combustion vane mounted on said shaft within the combustion cylinder and having an outer end disposed adjacent the inner surface of the combustion cylinder, said vanes extending substantially throughout the length of their respective cylinders and orientated substantially at 90° relation to each other, a hollow cylindrical sleeve valve rotatably mounted within the compression cylinder and rotatable about an axis eccentric to the axis of the shaft, said valve having a slot therein receiving the compression vane, means admitting air into the compression cylinder, said plate having a passageway intercommunicating said cylinders, and valve means in said passageway for discharging compressed air from the compression cylinder, said air admitting means adapted to receive a fuel and air mixing device, said combustion cylinder including a rotary cylindrical sleeve valve mounted therein for rotation about an axis eccentric to the shaft, said combustion sleeve valve including a slot receiving the combustion vane, said combustion cylinder adapted to receive ignition means for igniting the fuel and air combustible mixture within the interior of the combustion sleeve valve, and exhaust means for the combustion cylinder for exhausting the combustion products, said valve means including a timed rotary valve interconnecting the compressor discharge and the interior space between the sleeve valve and the cylinder for admitting pressurized combustible mixture at predetermined intervals, and means for operating said valve in timed relationship to the shaft.

2. A rotary internal combustion engine comprising a compression cylinder and a combustion cylinder arranged in axial alignment with the compression cylinder having at least twice the volume of the combustion cylinder, each of said cylinders having outer end walls, a relatively thick plate separating the cylinders, a common shaft extending throughout the length of said cylinders, a compression vane mounted on said shaft within the compression cylinder and having an outer end disposed adjacent the inner surface of the compression cylinder, a combustion vane mounted on said shaft within the combustion cylinder and having an outer end disposed adjacent the inner surface of the combustion cylinder, said vanes extending substantially throughout the length of their respective cylinders and orientated substantially at 90° relation to each other, a hollow cylindrical sleeve valve rotatably mounted within the compression cylinder and rotatable about an axis eccentric to the axis of the shaft, said valve having a slot therein receiving the compression vane, means admitting air into the compression cylinder, said plate having a passageway intercommunicating said cylinders, and valve means in said passageway for discharging compressed air from the compression cylinder, said air admitting means adapted to receive a fuel and air mixing device, said combustion cylinder including a rotary cylindrical sleeve valve mounted therein for rotation about an axis eccentric to the shaft, said combustion sleeve valve including a slot receiving the combustion vane, said combustion cylinder adapted to receive ignition means for igniting the fuel and air combustible mixture within the interior of the combustion sleeve valve, and exhaust means for the combustion cylinder for exhausting the combustion products, said valve means including a timed rotary valve interconnecting the compressor discharge and the interior space between the sleeve valve and the cylinder for admitting pressurized combustible mixture at predetermined intervals, and means for operating said valve in timed relationship to the shaft, said rotary valve including a recess communicating the compressor discharge with the interior of the combustion sleeve valve at certain positions of the valve, gear means connected to the valve, said valve operating means including a shaft connected with the gear means with the shaft disposed exteriorly of the cylinder, and means driving the exterior shaft from the central shaft of the engine.

3. A rotary internal combustion engine comprising a compression cylinder and a combustion cylinder arranged in axial alignment with the compression cylinder having at least twice the volume of the combustion cylinder, each of said cylinders having outer end walls, a relatively thick plate separating the cylinders, a common shaft extending throughout the length of said cylinders, a compression vane mounted on said shaft within the compression cylinder and having an outer end disposed adjacent the inner surface of the compression cylinder, a combustion vane mounted on said shaft within the combustion cylinder and having an outer end disposed adjacent the inner surface of the combustion cylinder, said vanes extending substantially throughout the length of their respective cylinders and orientated substantially at 90° relation to each other, a hollow cylindrical sleeve valve rotatably mounted within the compression cylinder and rotatable about an axis eccentric to the axis of the shaft, said valve having a slot therein receiving the compression vane, means admitting air into the compression cylinder, said plate having a passageway intercommunicating said cylinders, and valve means in said passageway for discharging compressed air from the compression cylinder, said air admitting means adapted to receive a fuel and air mixing device, said combustion cylinder including a rotary cylindrical sleeve valve mounted therein for rotation about an axis eccentric to the shaft, said combustion sleeve valve including a slot receiving the combustion vane, said combustion cylinder adapted to receive ignition means for igniting the fuel and air combustible mixture within the interior of the combustion sleeve valve, and exhaust means for the combustion cylinder for exhausting the combustion products, said valve means including a timed rotary valve interconnecting the compressor discharge and the interior space between the sleeve valve and the cylinder for admitting pressurized combustible mixture at predetermined intervals, and means for operating said valve in timed relationship to the shaft, said rotary valve including a recess communicating the compressor discharge with the interior of the combustion sleeve valve at certain positions of the valve, gear means connected to the valve, said valve operating means including a shaft connected with the gear means with the shaft disposed exteriorly of the cylinder, and means driving the exterior shaft from the central shaft of the engine, said combustion cylinder including a jacket enclosing the cylinder in spaced relation to provide an air space therebetween whereby cooling air may be forced through the air space for cooling the interior of the combustion sleeve.

4. A rotary internal combustion engine comprising a compression cylinder and a combustion cylinder arranged in axial alignment with the compression cylinder having at least twice the volume of the combustion cylinder, each of said cylinders having outer end walls, a relatively thick plate separating the cylinders, a common shaft extending throughout the length of said cylinders, a compression vane mounted on said shaft within the compression cylinder and having an outer end disposed adjacent the inner surface of the compression cylinder, a combustion vane mounted on said shaft within the combustion cylinder and having an outer end disposed adjacent the inner surface of the combustion cylinder, said vanes extending substantially throughout the length of their respective cylinders and orientated substantially at 90° relation to each other, a hollow cylindrical sleeve valve rotatably mounted within the compression cylinder and rotatable about an axis eccentric to the axis of the shaft, said valve having a slot therein receiving the compression vane, means admitting air into the compression cylinder, said plate having a passageway intercommunicating said cylinders, and valve means in said passageway for discharging compressed air from the compression cylinder, said air admitting means adapted to receive a fuel and air mixing device, said combustion cylinder including a rotary cylindrical sleeve valve mounted therein for rotation about an axis eccentric to the shaft, said combustion sleeve valve including a slot receiving the combustion vane, said combustion cylinder adapted to receive ignition means for igniting the fuel and air combustible mixture within the interior of the combustion sleeve valve, and exhaust means for the combustion cylinder for exhausting the combustion products, said valve means including a timed rotary valve interconnecting the compressor discharge and the interior space between the sleeve valve and the cylinder for admitting pressurized combustible mixture at predetermined intervals, and means for operating said valve in timed relationship to the shaft, said rotary valve including a recess communicating the compressor discharge with the interior of the combustion sleeve valve at certain positions of the valve, gear means connected to the valve, said valve operating means including a shaft connected with the gear means with the shaft disposed exteriorly of the cylinder, and means driving the exterior shaft from the central shaft of the engine, said combustion cylinder including a jacket enclosing the cylinder in spaced relation to provide an air space therebetween whereby cooling air may be forced through the air space for cooling the interior of the combustion sleeve, said combustion vanes are each adjustable longitudinally and radially to conform to the interior dimensions of the cylinder.

5. The structure as defined in claim 4 wherein each of said cylinders includes an outwardly bulged portion receiving a portion of the periphery of the sleeve valve for forming a fluid seal between the cylinder and the sleeve valve thereby providing a compression chamber in the compression cylinder and an expansion chamber in the combustion cylinder.

6. The structure as defined in claim 5 wherein said combustion sleeve valve and vane therein admit cooling air into the interior of the combustion cylinder for intermittently cooling the interior thereof while continuously cooling the exterior surface thereof.

References Cited in the file of this patent

UNITED STATES PATENTS

| 944,362 | Hathaway | Dec. 28, 1909 |
| 2,193,178 | Laythorpe | Mar. 12, 1940 |
| 2,461,757 | Moores | Feb. 15, 1949 |
| 2,853,061 | Elsbett | Sept. 23, 1958 |

FOREIGN PATENTS

| 22,872 | Great Britain | 1910 |
| 435,379 | Italy | May 17, 1948 |